(12) United States Patent
Nguyen et al.

(10) Patent No.: US 9,947,080 B2
(45) Date of Patent: Apr. 17, 2018

(54) DISPLAY OF A VISUAL EVENT NOTIFICATION

(71) Applicant: Nokia Technologies Oy, Espoo (FI)

(72) Inventors: David Nguyen, Santa Clara, CA (US); Audrey Desjardins, Vancouver (CA)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/914,800

(22) PCT Filed: Sep. 16, 2014

(86) PCT No.: PCT/US2014/055829
§ 371 (c)(1),
(2) Date: Feb. 26, 2016

(87) PCT Pub. No.: WO2015/042034
PCT Pub. Date: Mar. 26, 2015

(65) Prior Publication Data
US 2016/0217769 A1 Jul. 28, 2016

Related U.S. Application Data

(60) Provisional application No. 61/879,063, filed on Sep. 17, 2013.

(51) Int. Cl.
*G06T 15/00* (2011.01)
*G06T 3/60* (2006.01)
(Continued)

(52) U.S. Cl.
CPC ............... *G06T 3/60* (2013.01); *G06F 1/163* (2013.01); *G06F 1/1626* (2013.01);
(Continued)

(58) Field of Classification Search
CPC ...... G06F 3/0487; G06F 1/163; G06F 1/1637; G06F 1/1684; G06F 1/1694;
(Continued)

(56) References Cited

U.S. PATENT DOCUMENTS 6,115,025 A 9/2000 Buxton et al.
8,209,635 B2 * 6/2012 Thom .................. G06F 1/1626
345/156
(Continued)

FOREIGN PATENT DOCUMENTS

EP 1 143 326 A2 10/2001
JP 2005-348000 12/2005
(Continued)

OTHER PUBLICATIONS

International Search Report and Written Opinion received for corresponding Patent Cooperation Treaty Application No. PCT/US2014/055829, dated Jan. 13, 2015, 11 pages.
(Continued)

*Primary Examiner* — Phu K Nguyen
(74) *Attorney, Agent, or Firm* — Alston & Bird LLP

(57) ABSTRACT

A method comprising entering a passive viewing state of an apparatus, determining occurrence of a software event, generating a visual event notification that is indicative of the software event based, at least in part, on the passive viewing state, causing display, on a display, of the visual event notification in conformance with an impaired-viewing display mode based, at least in part, on passive viewing state, receiving environmental sensor information, determining that the environmental sensor information indicates that the apparatus is actively viewed by a user, entering an active viewing state of the apparatus based, at least in part, on the determination that the environmental sensor information indicates that the apparatus is actively viewed by the user, and causing display, on the display, of different visual information in conformance with an unimpaired-viewing display mode based, at least in part, on the active viewing state is disclosed.

20 Claims, 8 Drawing Sheets

(51) Int. Cl.

| | |
|---|---|
| *G06F 3/0487* | (2013.01) |
| *G06F 1/16* | (2006.01) |
| *G06F 3/01* | (2006.01) |
| *G09G 5/30* | (2006.01) |
| *G06F 3/0482* | (2013.01) |
| *G06F 3/0346* | (2013.01) |
| *G06F 3/041* | (2006.01) |
| *G06F 3/0481* | (2013.01) |
| *G06F 3/0484* | (2013.01) |
| *G06F 3/14* | (2006.01) |
| *G09G 5/391* | (2006.01) |

(52) U.S. Cl.
CPC .......... *G06F 1/1637* (2013.01); *G06F 1/1684* (2013.01); *G06F 1/1694* (2013.01); *G06F 3/013* (2013.01); *G06F 3/017* (2013.01); *G06F 3/0346* (2013.01); *G06F 3/041* (2013.01); *G06F 3/0481* (2013.01); *G06F 3/0482* (2013.01); *G06F 3/0487* (2013.01); *G06F 3/04845* (2013.01); *G06F 3/14* (2013.01); *G09G 5/30* (2013.01); *G09G 5/391* (2013.01); *G06F 2200/1637* (2013.01); *G09G 2320/02* (2013.01); *G09G 2320/06* (2013.01); *G09G 2320/0626* (2013.01); *G09G 2340/14* (2013.01); *G09G 2354/00* (2013.01)

(58) Field of Classification Search
CPC ............. G06F 2200/1637; G06F 3/017; G06F 3/0482; G09G 2354/00; G06T 3/60
USPC ......................................................... 345/418
See application file for complete search history.

(56) References Cited

U.S. PATENT DOCUMENTS

| | | | |
|---|---|---|---|
| 8,289,162 B2 | 10/2012 | Mooring et al. | |
| 8,351,773 B2 | 1/2013 | Nasiri et al. | |
| 8,750,565 B2* | 6/2014 | Wu .......................... | G09G 5/00 382/103 |
| 9,318,143 B2* | 4/2016 | Pai ......................... | G11B 15/18 |
| 9,417,666 B2* | 8/2016 | Abraham .............. | G06F 1/1694 |
| 9,582,851 B2* | 2/2017 | Raman ..................... | G01V 8/12 |
| 2002/0080132 A1 | 6/2002 | Dai et al. | |
| 2002/0158812 A1 | 10/2002 | Pallakoff | |
| 2004/0201595 A1 | 10/2004 | Manchester | |
| 2007/0004451 A1 | 1/2007 | Anderson | |
| 2008/0045207 A1 | 2/2008 | Ahn et al. | |
| 2008/0259094 A1 | 10/2008 | Kim et al. | |
| 2009/0007006 A1 | 1/2009 | Liu et al. | |
| 2009/0066637 A1 | 3/2009 | McCall | |
| 2009/0164896 A1 | 6/2009 | Thorn | |
| 2010/0064259 A1 | 3/2010 | Alexanderovitc et al. | |
| 2010/0079508 A1 | 4/2010 | Hodge et al. | |
| 2010/0088061 A1 | 4/2010 | Horodezky et al. | |
| 2010/0125816 A1 | 5/2010 | Bezos | |
| 2011/0074671 A1 | 3/2011 | Shimosato et al. | |
| 2011/0156869 A1 | 6/2011 | Watt | |
| 2011/0316888 A1 | 12/2011 | Sachs et al. | |
| 2012/0038675 A1 | 2/2012 | Johnson et al. | |
| 2012/0233059 A1 | 9/2012 | Buck | |
| 2012/0235790 A1 | 9/2012 | Zhao et al. | |
| 2013/0002541 A1 | 1/2013 | Kanehira | |
| 2013/0033485 A1 | 2/2013 | Kollin et al. | |
| 2013/0042209 A1 | 2/2013 | Leon et al. | |
| 2013/0135196 A1 | 5/2013 | Park et al. | |
| 2013/0222271 A1 | 8/2013 | Alberth et al. | |
| 2013/0342569 A1 | 12/2013 | Karkkainen et al. | |
| 2014/0009499 A1 | 1/2014 | Gardenfors et al. | |
| 2014/0132508 A1* | 5/2014 | Hodge .................... | G06F 3/013 345/156 |
| 2014/0152559 A1 | 6/2014 | Chen | |
| 2014/0369525 A1 | 12/2014 | Lin | |
| 2015/0024678 A1 | 1/2015 | Chang et al. | |
| 2015/0042554 A1 | 2/2015 | Chen et al. | |
| 2015/0097773 A1 | 4/2015 | Liao et al. | |
| 2015/0116601 A1 | 4/2015 | Wang et al. | |
| 2016/0195925 A1 | 7/2016 | Nguyen et al. | |
| 2016/0217554 A1 | 7/2016 | Nguyen et al. | |

FOREIGN PATENT DOCUMENTS

| | | |
|---|---|---|
| JP | 2006-155268 | 6/2006 |
| JP | 2006-243784 | 9/2006 |
| JP | 2006-320738 | 11/2006 |
| JP | 2008-011035 | 1/2008 |
| JP | 2008-217444 | 9/2008 |
| JP | 2011-510364 | 3/2011 |
| JP | 2012-509544 | 4/2012 |
| JP | 2013-114691 | 6/2013 |
| WO | WO 01/43473 A1 | 6/2001 |
| WO | WO 2009/045279 A2 | 4/2009 |
| WO | 2013081598 | 6/2013 |
| WO | WO 2013/099128 | 7/2013 |
| WO | WO 2013/162564 A1 | 10/2013 |
| WO | WO 2014/142382 A1 | 9/2014 |

OTHER PUBLICATIONS

Supplementary European Report for Application No. EP 14 84 6714.5 dated Apr. 13, 2017.
International Search Report and Written Opinion for Application No. PCT/US2014/055962 dated Dec. 31, 2014.
Extended European Search Report for Application No. EP 14846378.9 dated Apr. 12, 2017.
International Search Report and Written Opinion for Application No. PCT/US2014/055959 dated Dec. 22, 2014.
Extended European Search Report for Application No. EP 14845472.1 dated Apr. 12, 2017.
Lyons et al., "Loupe: A Handheld Near-Eye Display", Proceedings of the $27^{27}$ annual ACM symposium on User interface software and technology, Oct. 5-8, 2014, pp. 351-354.
Gupta et al., "Gesture Pendant II", Research Paper, Oct. 1, 2006, pp. 1-5.
Office action received for corresponding Saudi Arab Patent Application No. 516370712, dated OA date Oct. 4, 2016, 1 pages of office action and no pages of office action translation available.
"The SnackBox: A Handheld Near-Eye Display", Draft version, CHI, 2014, pp. 1-8.
Office Action for U.S. Appl. No. 14/914,165 dated Aug. 24, 2017, 21 pages.
Office Action for U.S. Appl. No. 14/915,733 dated Sep. 8, 2017, 8 pages.
Office action received for corresponding Japanese Patent Application No. 2016-543957, dated Apr. 25, 2017, 4 pages of office action and 7 pages of translation available.
Office Action from Japanese Patent Application No. 2016-543957, dated Oct. 17, 2017, 6 pages.
Office Action for U.S. Appl. No. 14/914,165 dated Dec. 21, 2017.

* cited by examiner

DISPLAY OF A VISUAL EVENT NOTIFICATION

RELATED APPLICATION

This application was originally filed as PCT Application No. PCT/US2014/055829 filed Sep. 16, 2014, which claims priority benefit from U.S. Provisional Application No. 61/879,063, filed Sep. 17, 2013.

TECHNICAL FIELD

The present application relates generally to display of a visual event notification.

BACKGROUND

In recent times, electronic apparatuses have become increasingly pervasive in our society. In many circumstances, a user may often view information displayed by an electronic apparatuses and/or electronic apparatus peripherals in performance of various activities, in various contexts, and/or the like. As such, it may be desirable to configure an apparatus such that a user of the apparatus may view information displayed by the apparatus in a simple and intuitive manner.

SUMMARY

Various aspects of examples of the invention are set out in the claims.

One or more embodiments may provide an apparatus, a computer readable medium, a non-transitory computer readable medium, a computer program product, and/or a method for entering a passive viewing state of an apparatus, determining occurrence of a software event, generating a visual event notification that is indicative of the software event based, at least in part, on the passive viewing state, causing display, on a display, of the visual event notification in conformance with an impaired-viewing display mode based, at least in part, on passive viewing state, receiving environmental sensor information, determining that the environmental sensor information indicates that the apparatus is actively viewed by a user, entering an active viewing state of the apparatus based, at least in part, on the determination that the environmental sensor information indicates that the apparatus is actively viewed by the user, and causing display, on the display, of different visual information in conformance with an unimpaired-viewing display mode based, at least in part, on the active viewing state.

One or more embodiments may provide an apparatus, a computer readable medium, a computer program product, and/or a non-transitory computer readable medium having means for entering a passive viewing state of an apparatus, means for determining occurrence of a software event, means for generating a visual event notification that is indicative of the software event based, at least in part, on the passive viewing state, means for causing display, on a display, of the visual event notification in conformance with an impaired-viewing display mode based, at least in part, on passive viewing state, means for receiving environmental sensor information, means for determining that the environmental sensor information indicates that the apparatus is actively viewed by a user, means for entering an active viewing state of the apparatus based, at least in part, on the determination that the environmental sensor information indicates that the apparatus is actively viewed by the user, and means for causing display, on the display, of different visual information in conformance with an unimpaired-viewing display mode based, at least in part, on the active viewing state.

In at least one example embodiment, the passive viewing state is an operational state in which information is caused to be displayed in conformance with an impaired-viewing display mode absent display of information in an unimpaired-viewing display mode.

In at least one example embodiment, the passive viewing state is characterized by a state in which the apparatus is configured in a manner that provides visual impairment compensation.

In at least one example embodiment, the active viewing state is characterized by a state in which the apparatus is configured in a manner that avoids visual impairment compensation.

In at least one example embodiment, the generation of the visual event notification based, at least in part, on the passive viewing state is performed such that content of the visual event notification conforms with the impaired-viewing display mode.

In at least one example embodiment, the impaired-viewing display mode provides visual-impairment compensation by way of at least one format restriction.

In at least one example embodiment, generation of the visual event notification based, at least in part, on the passive viewing state is performed such that the content of the visual event notification conforms with the at least one format restriction.

In at least one example embodiment, the format restriction is a directive that governs format of content of the visual event notification such that one or more characteristics of the content of the visual event notification provide visual impairment compensation.

In at least one example embodiment, the format restriction comprises at least one of a color restriction, a shape restriction, an animation restriction, a pixel restriction, or a textual restriction.

In at least one example embodiment, the color restriction comprises at least one of a monochromatic color restriction, a high-contrast color restriction, or a primary color restriction.

In at least one example embodiment, the shape restriction limits visual representations comprised by the visual event notification to a set of predetermined geometrical shapes.

In at least one example embodiment, the animation restriction comprises a directive that requires the visual event notification to comprise an animation.

In at least one example embodiment, the pixel restriction comprises a limitation of pixel resolution of the display.

In at least one example embodiment, the limitation of pixel resolution comprises a limitation of one or more pixel dimensions of the visual event notification to be within a predetermined maximum number of pixels.

In at least one example embodiment, the textual restriction precludes the visual event notification from comprising textual information.

In at least one example embodiment, the impaired-viewing display mode is an operational mode of the apparatus in which one or more characteristics of the display are set in a manner that provides visual impairment compensation.

In at least one example embodiment, the impaired-viewing display mode provides visual-impairment compensation by way of at least one display directive.

In at least one example embodiment, causation of display of the visual event notification based, at least in part, on the passive viewing state is performed such that a representation of the visual event notification conforms with the at least one display directive.

In at least one example embodiment, the display directive comprises at least one of a high-brightness directive, a low resolution directive, or a flashing directive.

In at least one example embodiment, the high-brightness directive is configured to cause display of the visual event notification at a brightness level that is greater than a brightness level of the unimpaired-viewing display mode.

In at least one example embodiment, the low resolution directive is configured to cause display of the visual event notification at a pixel resolution that is less than a pixel resolution of the unimpaired-viewing display mode.

In at least one example embodiment, the pixel resolution of the impaired-viewing display mode is less than or equal to one tenth of a pixel resolution of the unimpaired-viewing display mode.

In at least one example embodiment, the flashing directive causes display of the visual event notification such that the visual event notification flashes.

In at least one example embodiment, the causation of display of the visual event notification is performed in conformance with the impaired-viewing display mode by way of constraining at least one display characteristic as directed by at least one of the high-brightness directive, the low resolution directive, or the flashing directive.

In at least one example embodiment, the determination that the environmental sensor information indicates that the apparatus is actively viewed by a user comprises at least one of determination that an orientation of the apparatus indicates that the apparatus is actively viewed by the user, determination that an eye of the user is proximate to the display, or determination that the user is holding the apparatus.

In at least one example embodiment, the environmental sensor information comprises information indicative of a direction of gravity in relation to the apparatus, and the determination that the environmental sensor information indicates that the apparatus is actively viewed by the user comprises determination that an orientation of the apparatus indicates that the apparatus is actively viewed by the user based, at least in part, on the information indicative of the direction of gravity.

In at least one example embodiment, a direction of gravity that is substantially parallel to a surface of the display indicates that the apparatus is actively viewed by the user.

In at least one example embodiment, the direction of gravity is substantially parallel to the surface of the display in circumstances where the direction of gravity deviates from being exactly parallel to the surface of the display within a predetermined threshold angle.

In at least one example embodiment, the environmental sensor information comprises proximity sensor information that indicates proximity of the user in relation to the display, and the determination that the environmental sensor information indicates that the apparatus is actively viewed by a user comprises determination that an eye of the user is proximate to the display based, at least in part, on the proximity sensor information.

In at least one example embodiment, the proximity sensor information indicating an object being within a threshold distance from the display indicates proximity of the user.

In at least one example embodiment, the environmental sensor information comprises touch sensor information indicative of a user holding the apparatus, and the determination that the environmental sensor information indicates that the apparatus is actively viewed by a user comprises determination that the user is holding the apparatus based, at least in part, on the touch sensor information.

In at least one example embodiment, the different visual information is different from the visual event notification.

In at least one example embodiment, the different visual information comprises a different visual event notification.

In at least one example embodiment, visual information that conforms with the unimpaired-viewing display mode is absent at least one format restriction that is associated with the impaired-viewing display mode.

In at least one example embodiment, the unimpaired-viewing display mode is an operational mode of the apparatus in which one or more characteristics of the display are set in a manner that avoids visual impairment compensation.

In at least one example embodiment, the unimpaired-viewing display mode provides at least one display directive, wherein the display directive avoids visual-impairment compensation.

In at least one example embodiment, causation of display of the visual event notification based, at least in part, on the active viewing state is performed such that a representation of the visual event notification conforms with the at least one display directive.

In at least one example embodiment, the display directive comprises at least one of a standard-brightness directive or a high resolution directive.

In at least one example embodiment, the standard-brightness directive is configured to cause display of the different visual event notification at a brightness level that is lower than a brightness level of the impaired-viewing display mode.

In at least one example embodiment, the high resolution directive is configured to cause display of the visual event notification at a pixel resolution that is higher than a pixel resolution of the impaired-viewing display mode.

In at least one example embodiment, the pixel resolution of the unimpaired-viewing display mode is equal to a native pixel resolution of the display.

In at least one example embodiment, the causation of display of visual information is performed in conformance with the unimpaired-viewing display mode by way of permitting at least one display characteristic as directed by at least one of the standard-brightness directive, or the high resolution directive.

One or more example embodiments further perform receipt of different environmental sensor information, determination that the different environmental sensor information indicates that the apparatus is not actively viewed by the user, and entering the passive viewing state of the apparatus based, at least in part, on the determination that the different environmental sensor information indicates that the apparatus is not actively viewed by the user.

In at least one example embodiment, the passive viewing state precludes display of information other than visual event notifications.

In at least one example embodiment, the determination that the environmental sensor information indicates that the apparatus is not actively viewed by a user comprises at least one of determination that an orientation of the apparatus indicates that the apparatus is not actively viewed by the user, determination that an eye of the user is distant to the display, or determination that the user is not holding the apparatus.

In at least one example embodiment, the environmental sensor information comprises information indicative of a direction of gravity in relation to the apparatus, and the determination that the environmental sensor information indicates that the apparatus is not actively viewed by the user comprises determination that an orientation of the apparatus indicates that the apparatus is not actively viewed by the user based, at least, in part, on the information indicative of the direction of gravity.

In at least one example embodiment, a direction of gravity substantially perpendicular to a surface of the display indicates that the apparatus is not actively viewed by the user.

In at least one example embodiment, the direction of gravity is substantially perpendicular to the surface of the display in circumstances where the direction of gravity deviates from being exactly perpendicular to the surface of the display within a predetermined threshold angle.

In at least one example embodiment, the environmental sensor information comprises proximity sensor information that indicates absence of the user proximate to the display, and the determination that the environmental sensor information indicates that the apparatus is not actively viewed by a user comprises determination that an eye of the user is distant to the display based, at least in part, on the proximity sensor information.

In at least one example embodiment, the proximity sensor information indicating an object being beyond a threshold distance from the display indicates absence of the user.

In at least one example embodiment, the environmental sensor information comprises touch sensor information indicative of a user not holding the apparatus, and the determination that the environmental sensor information indicates that the apparatus is not actively viewed by a user comprises determination that the user is not holding the apparatus based, at least in part, on the touch sensor information.

One or more example embodiments further perform determination of occurrence of another software event during the active viewing state, generation of another visual event notification that is indicative of the software event based, at least in part, on the active viewing state, and causation of display, on the display, of the other visual event notification in conformance with the unimpaired-viewing display mode based, at least in part, on the active viewing state.

In at least one example embodiment, the software event signifies receipt of a message, and the determination of the occurrence of the software event comprises receipt of the message.

In at least one example embodiment, the software event signifies occurrence of a calendar event that is associated with a calendar entry, and the determination of the occurrence of the software event comprises determination that a current time corresponds with an occurrence time of the calendar entry.

In at least one example embodiment, the software event signifies a receipt of a call, and the determination of the occurrence of the software event comprises receipt of the call.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
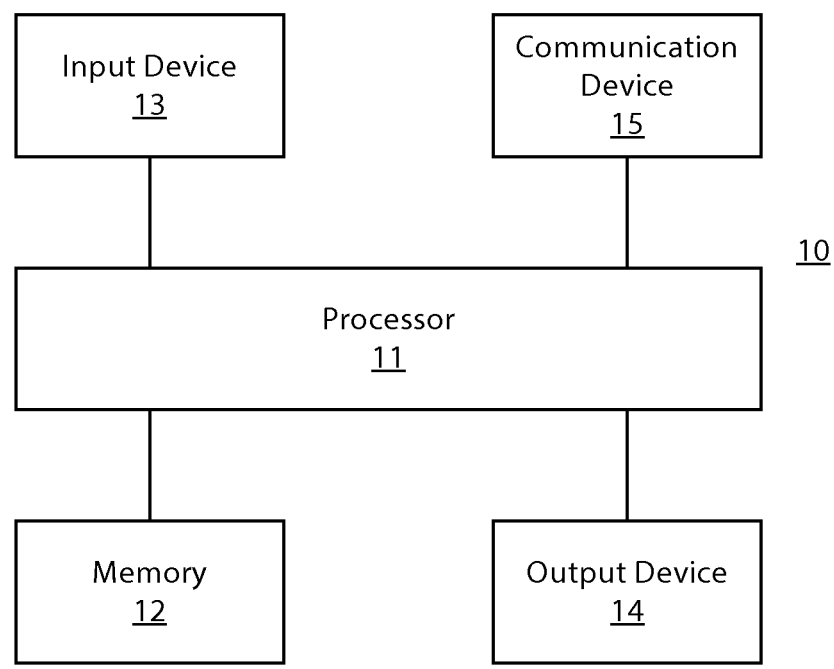
FIG. 1 is a block diagram showing an apparatus according to at least one example embodiment.

An embodiment of the invention and its potential advantages are understood by referring to FIGS. 1 through 7 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a pendant apparatus, a bracelet apparatus, a watch apparatus, a wearable apparatus, a monocular apparatus, a binocular apparatus, a telescope apparatus, a stereoscopic image apparatus, a virtual reality apparatus, an augmented reality apparatus, a kaleidoscope apparatus, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2F are diagrams illustrating a pendant apparatus according to at least one example embodiment. The examples of FIGS. 2A-2F are merely examples and do not limit the scope of the claims. For example, size of the apparatus, may vary, the shape of the apparatus may vary, the configuration of the apparatus may vary, and/or the like.

In some circumstances, it may be desirable to configure an electronic apparatus as a pendant apparatus. For example, configuration of an electronic apparatus as a pendant apparatus may permit a user of the electronic apparatus to easily transport the apparatus, wear the apparatus, interact with the apparatus, and/or the like. A pendant apparatus may refer to an electronic apparatus, such as an electronic apparatus similar as described regarding FIG. 1, comprising a pendant form factor. For example, an apparatus comprising a pendant form factor may comprise provisions for attaching the pendant apparatus to a necklace, easily handling the apparatus in the hand of a user, standing the apparatus upright on a table, and/or the like. In at least one example embodiment, a pendant apparatus comprises a necklace.

In some circumstances, it may be desirable for a pendant apparatus to comprise a display. For example, it may be desirable to display information to a user of the pendant apparatus. It may be desirable, in some circumstances, for a display comprised by a pendant apparatus to be a near eye display. For example, a near eye display may allow for the size of the apparatus to remain compact, allow for a user to view the display at a near distance with clarity, and/or the like. In at least one example embodiment, a pendant apparatus comprises a near eye display. In some circumstances, the pendant apparatus may be configured such that the near eye display is best viewed by a single eye of the user. In circumstances such as these, the pendant apparatus may be referred to as a monocular apparatus.

In some circumstances it may be desirable for a pendant apparatus to comprise multiple displays. For example, a pendant apparatus may be configured as a binocular apparatus. A binocular apparatus may refer to an electronic apparatus in which a first display is configured for viewing by a left eye of a user and a second display is configured for viewing by a right eye of a user, such that the displays may be viewed simultaneously by the user.

In some circumstances, it may be desirable for a pendant apparatus to receive environmental sensor information. For example, the apparatus may determine an apparatus orientation, a user input, an apparatus mode, and/or the like by receiving environmental sensor information from at least one environmental sensor. An environmental sensor may refer to an input device similar as described regarding FIG. 1. For example, an environmental sensor may be a touch sensor, an orientation sensor, an accelerometer, an infrared sensor, an optical sensor, a proximity sensor, a gyro, a magnetometer, an inertial sensor, and/or the like.

Figure 2A:
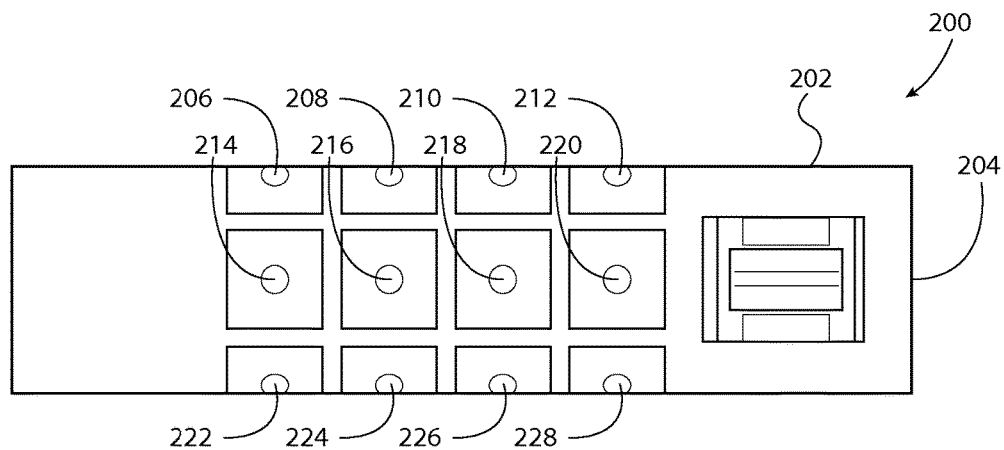
FIGS. 2A-2F are diagrams illustrating a pendant apparatus according to at least one example embodiment.
Figure 2B:
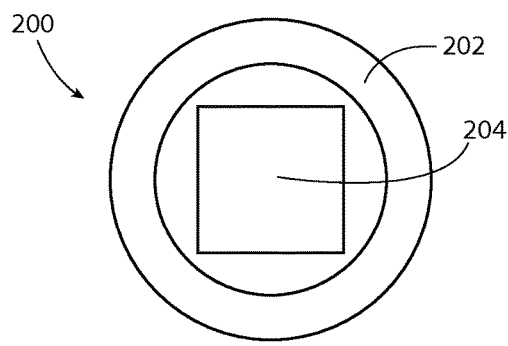
Figure 2C:
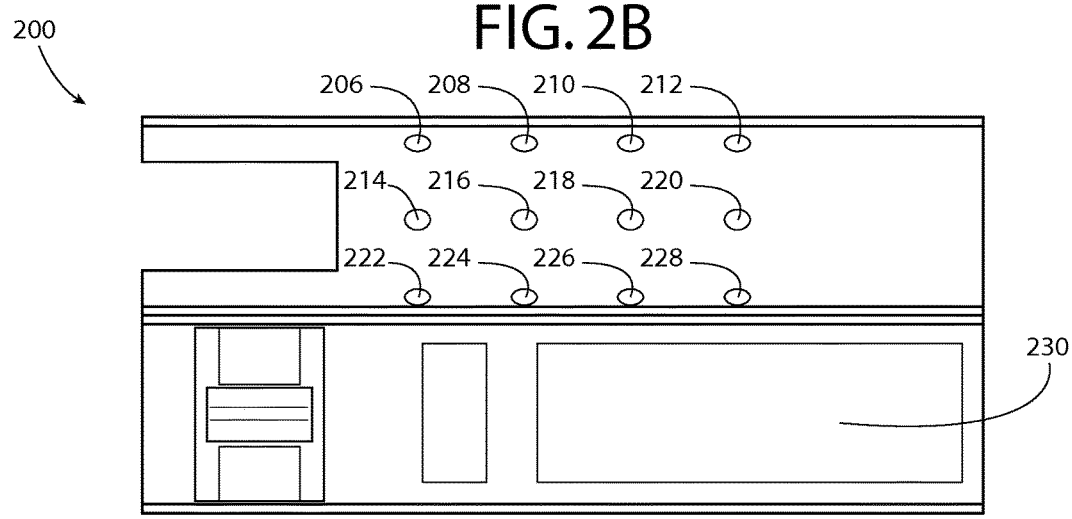

The examples of FIG. 2A-2C are diagrams illustrating apparatus 200 according to at least one example embodiment. FIG. 2A is a perspective view, FIG. 2B is a front view, and FIG. 2C is a cutaway view of the same example. In the example of FIGS. 2A-2C, apparatus 200 comprises enclosure 202, display 204, environmental sensors 206, 208, 210, 212, 214, 216, 218, 220, 222, 224, 226, and 228, and processor 230. The example of FIGS. 2A-2C depict apparatus 200 as a pendant apparatus, but it should be understood that apparatus 200 may be any type of electronic apparatus.

In some circumstances, a user may have an electronic apparatus similar as described regarding FIGS. 2A-2C under his control. In circumstances such as these, the apparatus may receive a notification of a message, a calendar alert, and/or the like. It may be desirable in circumstances such as these for the viewer to actively view the apparatus to perceive the notification, dismiss the alert, and/or the like. For example, the user may place the apparatus near his eyes, face the apparatus in his direction, and/or the like to actively view the apparatus. During active viewing of the apparatus, a user may be focusing his attention on the apparatus, interacting with the apparatus, and/or the like. For example, during an active viewing of the apparatus, a user may be actively reading information displayed on a display comprised by the apparatus.

Figure 2D:
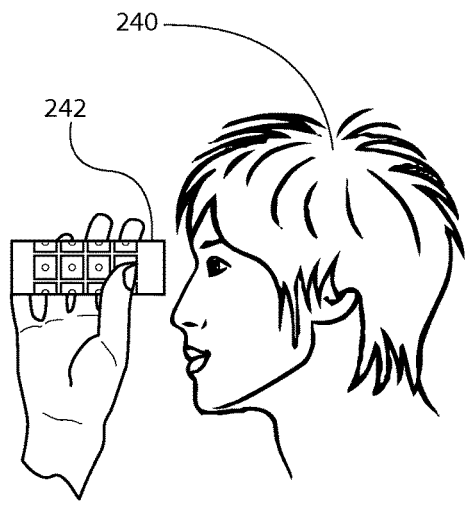

FIG. 2D is a diagram illustrating user 240 actively viewing a display comprised by apparatus 242. Even though the example of FIG. 2D depicts apparatus 242 as a pendant apparatus, apparatus 242 may be any type of electronic apparatus.

As previously described, in some circumstances, a user may have an electronic apparatus similar as described regarding FIGS. 2A-2C under his control. In some circumstances, an apparatus may be positioned such that the apparatus may not be actively viewed by the user. For example, the apparatus may be placed on a desk, placed in the user's pocket, worn on the user's body, and/or the like. In circumstances such as these, a display comprised by an apparatus may be passively viewed by a user of the apparatus. During passive viewing of the apparatus, a user may be focusing his attention on something other than the apparatus, ignoring the apparatus, viewing the apparatus with his peripheral vision, viewing the apparatus from a distance, and/or the like. For example, during passive viewing of the apparatus, a user may be reading information displayed on a display comprised by a different apparatus, performing a task independent of the apparatus, and/or the like. In this manner, an apparatus that is being passively viewed is not being actively viewed.

Figure 2E:
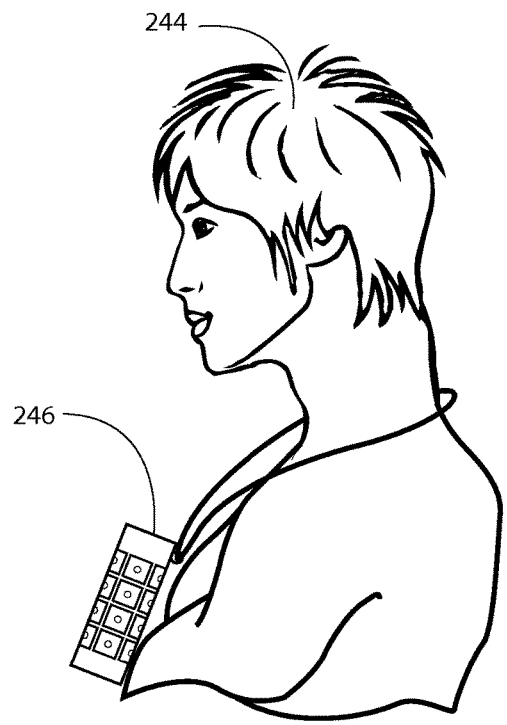

FIG. 2E is a diagram illustrating user 244 passively viewing a display comprised by apparatus 246. Even though the example of FIG. 2E depicts apparatus 244 as a pendant apparatus, apparatus 244 may be any type of electronic apparatus. It can be seen that apparatus 246 is attached to a necklace worn by user 244. Even though the example of FIG. 2E depicts apparatus 246 as being worn by user 244, apparatus 246 may be attached to user 244's clothing, carried in a pocket, carried in user 244's hand, and/or the like, such that apparatus 246 may be passively viewed by user 244.

Figure 2F:
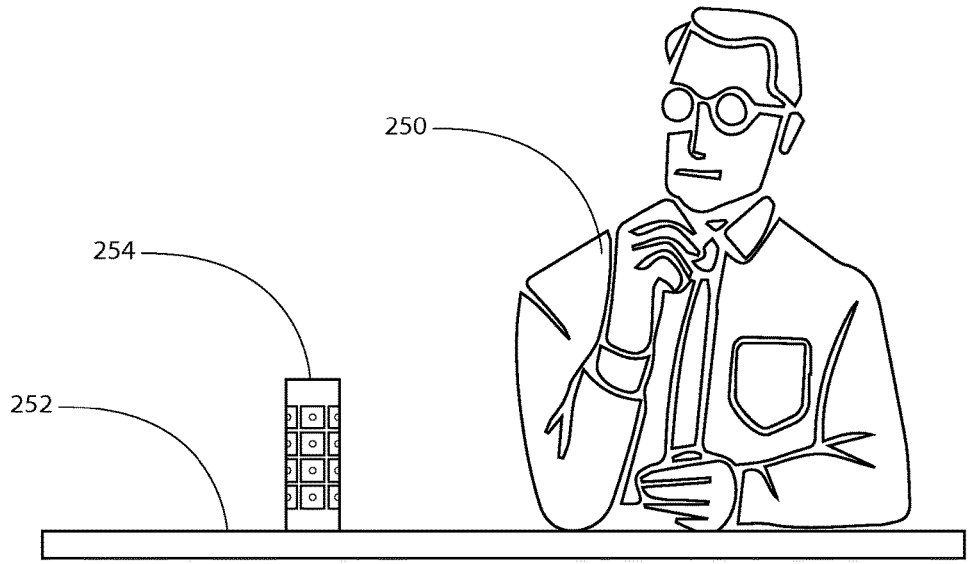

FIG. 2F is a diagram illustrating user 250 sitting at desk 252 passively viewing a display comprised by apparatus 254. Even though the example of FIG. 2F depicts apparatus 254 as a pendant apparatus, apparatus 254 may be any type of electronic apparatus. It can be seen that apparatus 254 is positioned upright on the top surface of desk 252. Even though the example of FIG. 2E depicts apparatus as upright on the top surface of desk 252, apparatus 254 may be positioned in other positions such that apparatus 254 may be passively viewed by user 250. For example, apparatus 254 may be placed upright on a floor surface, laying on a side of apparatus 254 on top of a surface of desk 252, and/or the like.

As previously described, a user may be actively viewing an apparatus. For example, the user may be interacting with the apparatus in a manner similar to user 240 of FIG. 2D interacting with apparatus 242. In circumstances such as these, it may be desirable for an apparatus to enter an active viewing state of the apparatus. For example, an apparatus may determine that the apparatus is being actively viewed by a user based, at least in part, on the active viewing state of the apparatus. An active viewing state may be characterized by a state in which the apparatus is configured in a manner that avoids visual impairment compensation. Visual impairment compensation may refer to the rendering of visual information in a manner that it is easier to perceive and/or comprehend when viewing conditions are less than ideal. For example, visual information rendered with visual impairment compensation may be rendered with a lower pixel resolution, with a higher brightness level, without textual information, and/or the like. Alternatively, visual information rendered without visual impairment compensation may be rendered with an increased pixel resolution, with a lower brightness level, with textual information, and/or the like.

As previously described, a user may be passively viewing an apparatus, not viewing an apparatus, and/or the like. For example, the apparatus may be passively viewed similar as described regarding FIGS. 2E-2F. In circumstances such as these, the user may transition from passive to active viewing. For example, a user may move the apparatus from a position similar as depicted in FIG. 2E or 2F to a position similar as depicted in FIG. 2D. In circumstances such as these, it may be desirable for an apparatus to enter an active viewing state of the apparatus, based, at least in part, on environmental sensor information. For instance, environmental sensor information may indicate that the apparatus is actively viewed by a user. For example, environmental sensor information may indicate that the apparatus has an apparatus orientation with respect to a user. In such an example, the apparatus orientation may be similar to the orientation of apparatus 242 of FIG. 2D with respect to user 240. In at least one example embodiment, the apparatus enters an active viewing state of the apparatus based, at least in part, on the determination that the environmental sensor information indicates that the apparatus is actively viewed by the user.

In some circumstances, an orientation of the apparatus may indicate that the apparatus is actively viewed by the user. For example, the apparatus may be oriented such that a display comprised by the apparatus is in a position in which the view is unobscured. For instance, the orientation of the apparatus when being actively viewed may be similar to the orientation of apparatus 242 of FIG. 2D. In circumstances such as these, it may be desirable for environmental sensor information to indicate that the apparatus is actively viewed by the user based, at least in part, on the orientation of the apparatus. In at least one example embodiment, determination that the environmental sensor information indicates that the apparatus is actively viewed by a user comprises determination that an orientation of the apparatus indicates that the apparatus is actively viewed by the user. In some circumstances, the direction of gravity in relation to an apparatus may indicate may indicate that apparatus is actively viewed by a user. For example, the apparatus may be actively viewed if the direction of gravity substantially parallel to a surface of a display comprised by the apparatus. For instance, it can be seen that the direction of gravity in FIG. 2D is substantially parallel to the display of apparatus 242. In at least one example embodiment, environmental sensor information comprises information indicative of a direction of gravity in relation to the apparatus. In at least one example embodiment, the direction of gravity is substantially parallel to the surface of the display in circumstances where the direction of gravity deviates from being exactly parallel to the surface of the display within a predetermined threshold angle. In at least one example embodiment, the threshold angle is a predetermined angle, such as 15 degrees, 28 degrees, 45 degrees, and/or the like. In at least one example embodiment, the threshold angle varies based on one or more physical characteristics of the apparatus, such as the size of the apparatus, resolution of the display, obscurance of the display by a housing of the apparatus, and/or the like. In at least one example embodiment, the threshold angle may be based, at least in part, on other environmental circumstances, such as the distance between the apparatus and the user, contact between the user and the apparatus, and/or the like. For example the threshold angle may be larger, when the user is further from the apparatus, when the apparatus is larger in size, and/or the like. In another example, the threshold angle may be smaller when the user is closer to the apparatus, when the apparatus is smaller in size, and/or the like.

In some circumstances, an eye of a user proximate to a display comprised by an apparatus may indicate that the apparatus is actively viewed by the user. For example, the display may be a near eye display. A user actively viewing a near eye display may have their eye proximate to the display in a similar manner to user 240's eye being proximate to apparatus 242 of FIG. 2D. In circumstances such as these, it may be desirable for environmental sensor information to indicate that the apparatus is actively viewed by the user based, at least in part, a determination that an eye of the user is proximate to the display. For example, the environmental sensor may be a proximity sensor, an infrared sensor, a sonar, a radar, a capacitive sensor, a light sensor, and/or the like, comprised by the apparatus. In at least one example embodiment, determination that the environmental sensor information indicates that the apparatus is actively viewed by a user comprises determination that an eye of the user is proximate to the display. In at least one example embodiment, the environmental sensor information comprises proximity sensor information that indicates proximity of the user in relation to the display. In at least one example embodiment, the proximity sensor information indicates proximity of the user in circumstances where the proximity sensor information indicates an object being within a threshold distance from the display. In at least one example embodiment, the threshold distance is a predetermined distance, such as 2 centimeters, 4 centimeters, 8 centimeters, and/or the like In at least one example embodiment, the threshold distance varies based on one or more physical characteristics of the apparatus, such as the size of the apparatus, resolution of the display, obscurance of the display by a housing of the apparatus, and/or the like. In at least one example embodiment, the threshold distance may be based, at least in part, on other environmental circumstances, such as the distance between the apparatus and the user, contact between the user and the apparatus, and/or the like. For example the threshold distance may be larger, when the user is further from the apparatus, when the apparatus is larger in size, and/or the like. In another example, the threshold distance may be smaller when the user is closer to the apparatus, when the apparatus is smaller in size, and/or the like. In some circumstances, a user holding an apparatus may indicate that the apparatus is actively viewed by the user. For example, a user may necessarily hold an apparatus while interacting with software associated with the apparatus. For instance, the apparatus may comprise touch sensors as an input for software control. A user actively viewing an apparatus may hold the apparatus in a similar manner to user 240 holding apparatus 242 of FIG. 2D. In circumstances such as these, it may be desirable for environmental sensor information to indicate that the apparatus is actively viewed by the user based, at least in part, on determination that the user is holding the apparatus. In at least one example embodiment, determination that the environmental sensor information indicates that the apparatus is actively viewed by a user comprises determination that the user is holding the apparatus. In at least one example embodiment, the environmental sensor information comprises touch sensor information indicative of a user holding the apparatus.

In some circumstances, it may be desirable to determine that an apparatus is actively viewed by a user based, at least in part, on a combination of environmental sensor information received from different environmental sensors. For instance, environmental sensor information may indicate that the apparatus is being actively viewed when no active viewing is occurring. For example, a user may briefly hold an apparatus to move it out of his way, or the apparatus may have an orientation consistent with viewing of the apparatus even though the apparatus is not being actively viewed. In circumstances such as these, the apparatus may determine that an apparatus is actively viewed by a user if a combination of environmental sensor information received from different environmental sensors is consistent with being actively viewed by a user. For example, the apparatus may determine that it is being actively viewed if it has a particular orientation and is simultaneously being held, if the apparatus is being held and the apparatus is proximate to the eye of the user, and/or the like.

As previously described, a user may be passively viewing an apparatus, not viewing an apparatus, and/or the like. For example, the apparatus may be passively viewed similar as described regarding FIGS. 2E-2F. In circumstances such as these, it may be desirable for an apparatus to enter a passive viewing state of the apparatus. For example, an apparatus may determine that the apparatus is not being actively viewed by a user based, at least in part, on the passive viewing state of the apparatus. A passive viewing state may be an operational state in which information is caused to be displayed in conformance with an impaired-viewing display mode absent display of information in an unimpaired-viewing display mode. A passive viewing state may be characterized by a state in which the apparatus is configured in a manner that provides visual impairment compensation.

As previously described, a user may be actively viewing an apparatus. For example, the user may be interacting with the apparatus in a manner similar to user 240 of FIG. 2D interacting with apparatus 242. In circumstances such as these, the user may transition from active to passive viewing. For example, a user may move the apparatus from a position similar as depicted in FIG. 2D to a position similar as depicted in FIG. 2E or 2F. In circumstances such as these, it may be desirable for an apparatus to enter a passive viewing state of the apparatus, based, at least in part, on environmental sensor information. For instance, environmental sensor information may indicate that the apparatus is not actively viewed by a user. For example, environmental sensor information may indicate that the apparatus has an apparatus orientation with respect to a user similar to the orientation of apparatus 246 of FIG. 2E with respect to user 244, similar to the orientation of apparatus 254 of FIG. 2F with respect to user 250, and/or the like. In at least one example embodiment, the apparatus enters a passive viewing state of the apparatus based, at least in part, on the determination that the environmental sensor information indicates that the apparatus is not actively viewed by the user.

In some circumstances, an orientation of the apparatus may indicate that the apparatus is not actively viewed by the user. For example, the apparatus may be oriented such that a display comprised by the apparatus is in a position in which the view is obscured. For instance, the orientation of the apparatus when being actively viewed may be similar to the orientation of apparatus 246 of FIG. 2E. In circumstances such as these, it may be desirable for environmental sensor information to indicate that the apparatus is not actively viewed by the user based, at least in part, on the orientation of the apparatus. In at least one example embodiment, determination that the environmental sensor information indicates that the apparatus is not actively viewed by a user comprises determination that an orientation of the apparatus indicates that the apparatus is not actively viewed by the user. In at least one example embodiment, the environmental sensor is a magnetometer, and environmental sensor information is indicative of an orientation of the apparatus relative to the magnetic north pole of the Earth. In some circumstances, the direction of gravity in relation to an apparatus may indicate may indicate that apparatus is not actively viewed by a user. For example, the apparatus may not be actively viewed if the direction of gravity substantially perpendicular to a surface of a display comprised by the apparatus. For instance, it can be seen that the direction of gravity in FIG. 2E is substantially perpendicular to the display of apparatus 246, and that the direction of gravity in FIG. 2F is substantially perpendicular to the display of apparatus 254. In at least one example embodiment, the direction of gravity is substantially perpendicular to the surface of the display in circumstances where the direction of gravity deviates from being exactly perpendicular to the surface of the display within a predetermined threshold angle. In at least one example embodiment, the threshold angle may be a predetermined angle, such as 15 degrees, 20 degrees, 45 degrees, and/or the like. In at least one example embodiment, the threshold angle varies based on one or more physical characteristics of the apparatus, such as the size of the apparatus, resolution of the display, obscurance of the display by a housing of the apparatus, and/or the like. In at least one example embodiment, the threshold angle may be based, at least in part, on other environmental circumstances, such as the distance between the apparatus and the user, contact between the user and the apparatus, and/or the like. For example the threshold angle may be larger, when the user is further from the apparatus, when the apparatus is larger in size, and/or the like. In another example, the threshold angle may be smaller when the user is closer to the apparatus, when the apparatus is smaller in size, and/or the like. In some circumstances, absences of an eye of a user proximate to a display comprised by an apparatus may indicate that the apparatus is not actively viewed by the user. For example, the display may be a near eye display. A user not actively viewing a near eye display may have their eye distant to the display in a similar manner to user 244's eye being distant to apparatus 246 of FIG. 2E, user 250's eye being distant to apparatus 254 of FIG. 2F, and/or the like. In circumstances such as these, it may be desirable for environmental sensor information to indicate that the apparatus is not actively viewed by the user based, at least in part, a determination that an eye of the user is distant to the display. For example, the environmental sensor may be a proximity sensor, an infrared sensor, a sonar, a radar, a capacitive sensor, a light sensor, and/or the like comprised by the apparatus. In at least one example embodiment, determination that the environmental sensor information indicates that the apparatus is not actively viewed by a user comprises determination that an eye of the user is distant to the display. In at least one example embodiment, the proximity sensor information indicates distance from the user in circumstances where the proximity sensor information indicates an object being beyond a threshold distance from the display. In at least one example embodiment, the threshold distance is a predetermined distance, such as 20 centimeters, 30 centimeters, 50 centimeters, and/or the like. In at least one example embodiment, the threshold distance varies based on one or more physical characteristics of the apparatus, such as the size of the apparatus, resolution of the display, obscurance of the display by a housing of the apparatus, and/or the like. In at least one example embodiment, the threshold distance may be based, at least in part, on other environmental circumstances, such as the distance between the apparatus and the user, contact between the user and the apparatus, and/or the like. For example the threshold distance may be larger, when the user is further from the apparatus, when the apparatus is larger in size, and/or the like. In another example, the threshold distance may be smaller when the user is closer to the apparatus, when the apparatus is smaller in size, and/or the like.

In some circumstances, absence of a user holding an apparatus may indicate that the apparatus is not actively viewed by the user. For example, it may be necessary for a user to hold an apparatus to interact with software associated with the apparatus. For instance, the apparatus may comprise touch sensors as an input for software control. A user that is not actively viewing an apparatus may not be holding the apparatus in a similar manner to user 244 not holding apparatus 246 of FIG. 2E, user 250 not holding apparatus 254 of FIG. 2F, and/or the like. In circumstances such as these, it may be desirable for environmental sensor information to indicate that the apparatus is not actively viewed by the user based, at least in part, on determination that the user is not holding the apparatus. In at least one example embodiment, determination that the environmental sensor information indicates that the apparatus is not actively viewed by a user comprises determination that the user is not holding the apparatus. In at least one example embodiment, the environmental sensor information comprises touch sensor information indicative of a user not holding the apparatus.

In some circumstances, it may be desirable to determine that an apparatus is not actively viewed by a user based, at least in part, on a combination of environmental sensor information received from different environmental sensors. For instance, environmental sensor information may indicate that the apparatus is not being actively viewed when active viewing is occurring. For example, a user may briefly pull the apparatus away from his eye, the apparatus may have an orientation inconsistent with viewing of the apparatus even though the apparatus is being actively viewed, and/or the like. In circumstances such as these, the apparatus may determine that an apparatus is not actively viewed by a user if a combination of environmental sensor information received from different environmental sensors is consistent with not being actively viewed by a user. For example, the apparatus may determine that it is not being actively viewed if it has a particular orientation and is simultaneously not being held, if the apparatus is not being held and the apparatus is distant from the eye of the user, and/or the like.

Figure 3A:
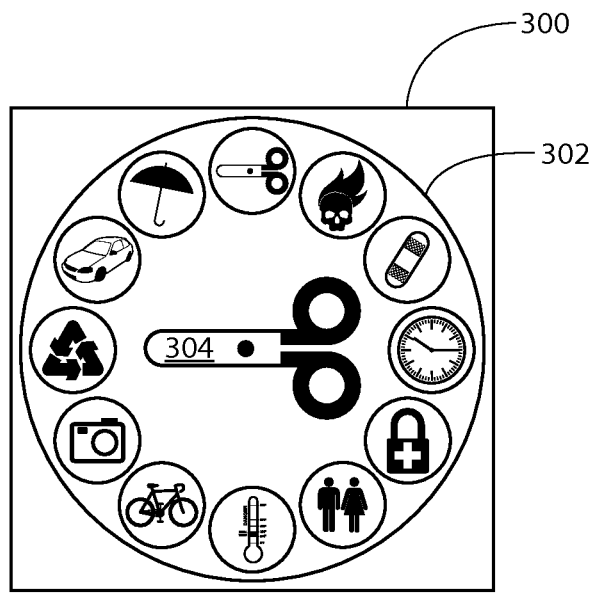
FIGS. 3A-3C are diagrams illustrating an unimpaired-viewing display mode according to at least one example embodiment.
Figure 3B:
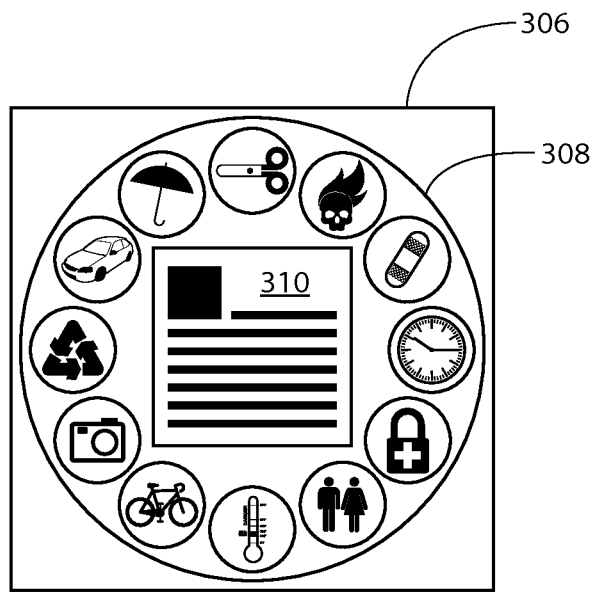
Figure 3C:
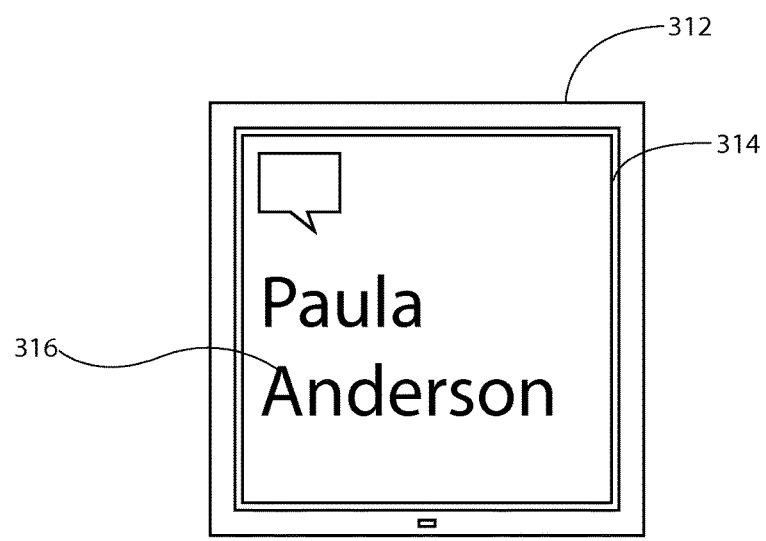

FIGS. 3A-3C are diagrams illustrating an unimpaired-viewing display mode according to at least one example embodiment. The examples of FIGS. 3A-3C are merely examples and do not limit the scope of the claims. For example, the display may vary, the unimpaired-viewing mode may vary, the number of displays may vary, and/or the like.

As previously described, in some circumstances, an apparatus may cause a display of visual information. For example, the display may cause display of visual information representative of an application, a document, an image, a video, and/or the like. FIG. 3A is a diagram illustrating apparatus 300 comprising display 302. In the example of FIG. 3A, display 302 is displaying visual information 304. It should be understood that visual information 304 is representative of an application, is associated with an application, is caused to be displayed on the display by an application, and/or the like.

FIG. 3B is a diagram illustrating apparatus 306 comprising display 308. In the example of FIG. 3B, display 308 is displaying visual information 308. It should be understood that visual information 308 is representative of at least a portion of a document, is associated with at least a portion of a document, is caused to be displayed on the display by an application associated with documents, and/or the like.

In some circumstances, it may be desirable for an apparatus to determine an occurrence of a software event. For example, the software event may require a response from the apparatus, the software event may trigger the apparatus to perform a function, and/or the like. In at least one example embodiment, the apparatus determines occurrence of a software event. In at least one example embodiment, the software event is receipt of a message. In such an example, the determination of the occurrence of the software event may comprise receipt of the message. In at least one example embodiment, the software event is occurrence of a calendar event. Such a calendar event may be associated with a calendar entry. In such an example, the determination of the occurrence of the software event may comprise determination that a current time corresponds with an occurrence time of the calendar entry. In at least one example embodiment, the software event is a receipt of a call. In such an example, the determination of the occurrence of the software event may comprise receipt of the call.

As previously described, the apparatus may determine occurrence of a software event, such as receipt of a message, occurrence of a calendar event, receipt of a call, and/or the like. In such an example, the apparatus may determine a notification to be rendered based, at least in part, on the software event. In this manner, the notification may comprise information indicative of the software event. For example, in circumstances where the software event is receipt of a message, the notification may comprise information indicative of a sender of the message, such as contact information, name information, address information, phone number information, and/or the like. In another example, in circumstances where the software event is occurrence of a calendar event, the notification may comprise information indicative of a title of the calendar entry, an occurrence time of the calendar entry, and/or the like. In still another example, in circumstances where the software event is receipt of a call, the notification may comprise information indicative of a caller of the call, information indicative that a call in is being received, information indicative that a call has been received, and/or the like. The information indicative of a caller of the call may be any information that indicates the caller, such as contact information, name information, address information, phone number information, and/or the like. In at least one example embodiment, the notification comprises a visual event notification. A visual event notification may comprise visual information indicative of the notification. For example the visual indication may comprise text information, graphical information, video information, and/or the like. In at least one example embodiment, the apparatus generates a visual event notification that is indicative of the software event FIG. 3C is a diagram illustrating apparatus 312 comprising display 314. In the example of FIG. 3C, display 314 is displaying visual information 316. It should be understood that visual information 316 is representative of a visual event notification.

Figures 4A, 4B:
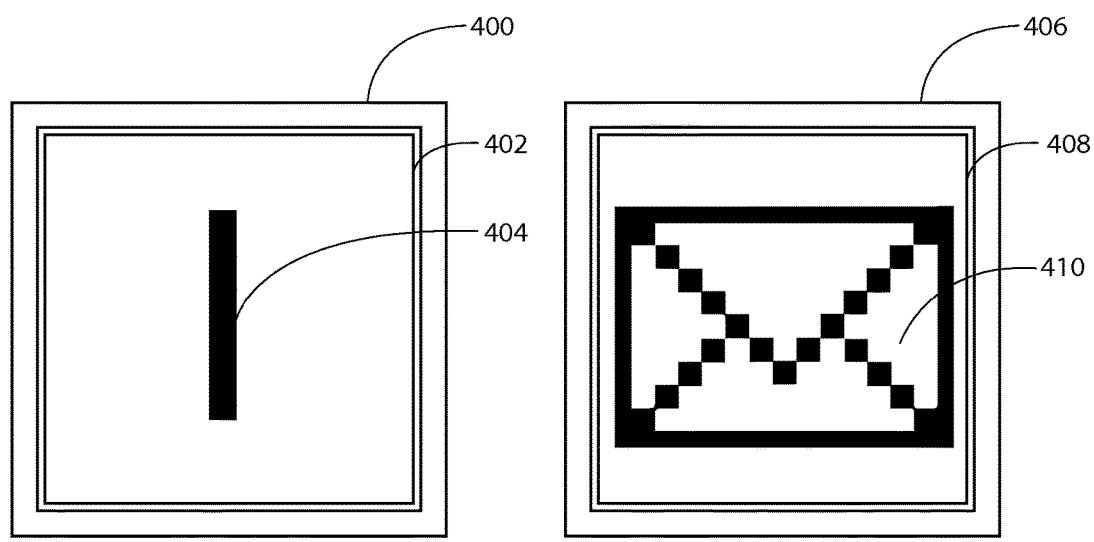
FIGS. 4A-4B are diagrams illustrating an impaired-viewing display mode according to at least one example embodiment.

FIGS. 4A-4B are diagrams illustrating an impaired-viewing display mode according to at least one example embodiment. The examples of FIGS. 4A-4B are merely examples and do not limit the scope of the claims. For example, the type of display may vary, the number of displays may vary, the shape of the display may vary, and/or the like. In some circumstances, it may be desirable to generate a visual event notification that is indicative of the software event based, at least in part, on a passive viewing state. For example, the software event that triggered the visual event notification may have been received while the apparatus was in a passive viewing state, similar as described regarding FIGS. 2E-2F. In circumstances such as these, it may be desirable to cause display, on a display, of the visual event notification in conformance with an impaired-viewing display mode based, at least in part, on a passive viewing state. An impaired-viewing display mode may refer to an operational mode of the apparatus in which one or more characteristics of the display are set in a manner that provides visual impairment compensation. For example, generation of content based, at least in part, on the passive viewing state may be performed such that the content conforms with at least one format restriction, the content may be displayed with a constraining of at least one display characteristic, and/or the like. Format restriction may refer to a directive that governs format of content of the visual event notification such that one or more characteristics of the content of the visual event notification in a manner that provides visual impairment compensation. In at least one example embodiment, the passive viewing state precludes display of information other than visual event notifications. In at least one example embodiment, the impaired-viewing display mode provides visual-impairment compensation by way of at least one format restriction. In at least one example embodiment, generation of the visual event notification based, at least in part, on the passive viewing state is performed such that the content of the visual event notification conforms with the at least one format restriction. In at least one example embodiment, the impaired-viewing display mode provides visual-impairment compensation by way of at least one display directive. In at least one example embodiment, causation of display of the visual event notification based, at least in part, on the passive viewing state is performed such that a representation of the visual event notification conforms with the at least one display directive In some circumstances, it may be desirable to constrain a display characteristic by way of a high-brightness directive. For example, the high-brightness directive may be configured to cause display of the visual event notification at a brightness level that is greater than a brightness level of the unimpaired-viewing display mode. Increasing the brightness of a display may compensate for visual impairment by increasing the distance the display may be perceived by a user, enhancing the readability of the display in high ambient lighting, and/or the like.

In some circumstances, it may be desirable to constrain a display characteristic by way of a low resolution directive. For example, a low resolution directive may be configured to cause display of the visual event notification at a pixel resolution that is less than a pixel resolution of an unimpaired-viewing display mode. Such a low resolution directive may compensate for visual impairment by increasing the size of text, limiting fine detail in the visual information, and/or the like. In at least one example embodiment, the pixel resolution of the impaired-viewing display mode is less than or equal to a predetermined pixel resolution, such as one tenth of a pixel resolution of the unimpaired-viewing display mode. In at least one example embodiment, the pixel resolution varies based on one or more physical characteristics of the apparatus, such as the size of the apparatus, resolution of the display, obscurance of the display by a housing of the apparatus, and/or the like. In at least one example embodiment, the pixel resolution may be based, at least in part, on other environmental circumstances, such as the distance between the apparatus and the user, contact between the user and the apparatus, and/or the like. For example the pixel resolution may be lower, when the user is further from the apparatus, when the apparatus is smaller in size, and/or the like. In another example, the pixel resolution may be higher when the user is closer to the apparatus, when the apparatus is larger in size, and/or the like. In at least one example embodiment, the pixel resolution is a single pixel.

In some circumstances, it may be desirable to constrain a display characteristic by way of a flashing directive. For example, the flashing directive may cause display of the visual event notification such that the visual event notification flashes. Flashing may refer to a rapid change of color, brightness, and/or the like, on a display. In another example, flashing may be characterized by alternating between display of the visual event notification and termination of display of the visual event notification. Such a flashing directive may compensate for visual impairment by attracting the user's attention, by being perceptible by a user in the user's peripheral vision, and/or the like. In at least one example embodiment, the causation of display of the visual event notification is performed in conformance with the impaired-viewing display mode by way of at least one of constraining at least one display characteristic as directed by at least one of the high-brightness directive, the low resolution directive, or the flashing directive.

In some circumstances, it may be desirable for a format restriction to comprise a color restriction. For example, displaying visual information with monochromatic color, with high contrast color, with primary colors, and/or the like, may compensate for visual impairment. In such an example, the color restriction may limit the amount of detail in the visual information, make details within the visual information more distinguishable, and/or the like. In at least one example embodiment, a color restriction comprises at least one of a monochromatic color restriction, a high-contrast color restriction, or a primary color restriction.

In some circumstances, it may be desirable for a format restriction to comprise a shape restriction. For example, a shape restriction may limit visual representations comprised by the visual event notification to a set of predetermined geometrical shapes, such as a bar, rectangle, square, triangle, and/or the like. In such an example, the shape restriction may compensate for visual impairment by being easily recognizable from a distance, providing information in a manner that doesn't require reading text, and/or the like.

FIG. 4A is a diagram illustrating apparatus 400 comprising display 402. In the example of FIG. 4A, display 402 is displaying visual information 404. It should be understood that visual information 404 is representative of a visual event notification displayed in conformance with a shape restriction.

In some circumstances, it may be desirable for a format restriction to comprise an animation restriction. For example, an animation restriction may comprises a directive that requires the visual event notification to comprise an animation. For instance, the animation may cause movement of a visual event notification on a display. An example of such an animation may be scrolling a large bar, similar as depicted in FIG. 4A across the screen, rotating a simple shape, and/or the like. Such an animation may compensate for visual impairment by attracting the users attention, being perceptible by the user in the user's peripheral vision, and/or the like.

In some circumstances, it may be desirable for a format restriction to comprise a pixel restriction. For example, a pixel restriction may comprise a limitation of pixel resolution of the display. In at least one example embodiment, the limitation of pixel resolution comprises a limitation of one or more pixel dimensions of the visual event notification to be within a predetermined maximum number of pixels. Such a pixel restriction may compensate for visual impairment by making the visual information easily understandable from a distance, eliminating fine detail, and/or the like.

FIG. 4B is a diagram illustrating apparatus 406 comprising display 408. In the example of FIG. 4B, display 408 is displaying visual information 410. It should be understood that visual information 410 is representative of a visual event notification displayed in conformance with a pixel restriction.

In some circumstances, it may be desirable for a format restriction to comprise a textual restriction. For example, the textual restriction precludes the visual event notification from comprising textual information. Such a textual restriction may compensate for visual impairment by limiting visual information that may easily read from a distance, limiting the visual information to symbols, shapes, and colors, and/or the like.

In some circumstances, it may be desirable to generate a visual event notification that is indicative of the software event based, at least in part, on an active viewing state. For example, the software event that triggered the visual event notification may have been received while the apparatus was in an active viewing state, similar as described regarding FIG. 2D. In circumstances such as these it may be desirable to cause display, on a display, of the visual event notification in conformance with an unimpaired-viewing display mode based, at least in part, on a passive viewing state. An unimpaired-viewing display mode may refer to an operational mode of the apparatus in which one or more characteristics of the display are set in a manner that avoids visual impairment compensation. Visual information that conforms with the unimpaired-viewing display mode may be absent at least one format restriction that is associated with the impaired-viewing display mode. For example, content that conforms with the unimpaired-viewing display mode may be displayed absent a constraining of at least one display characteristic. In circumstances such as these, the visual event notification may comprise more content than a visual event notification displayed in conformance with an impaired-viewing display mode. For instance, such a visual notification may include text, images, documents, videos, and/or the like. For example, the visual event notification may be similar as described regarding FIG. 3C. In at least one example embodiment, the unimpaired-viewing display mode provides at least one display directive, wherein the display directive avoids visual-impairment compensation. In at least one example embodiment, causation of display of the visual event notification based, at least in part, on the active viewing state is performed such that a representation of the visual event notification conforms with the at least one display directive.

In some circumstances, it may be desirable for an unimpaired-viewing display mode to provide a standard-brightness directive. For example, the standard-brightness directive may be configured to cause display of the different visual event notification at a brightness level that is lower than a brightness level of the impaired-viewing display mode. Such a standard-brightness directive may increase viewer comfort when a display is viewed at close range, reduce distraction to persons other than the user, and/or the like.

In some circumstances, it may be desirable for an unimpaired-viewing display mode to provide a high resolution directive. For example, the high resolution directive may be configured to cause display of the visual event notification at a pixel resolution that is higher than a pixel resolution of the impaired-viewing display mode. Such high resolution may increase the clarity of text displayed on the display, increase detail of images, and/or the like. In at least one example embodiment, the pixel resolution of the unimpaired-viewing display mode is equal to the native pixel resolution of the display. In at least one example embodiment, the causation of display of visual information is performed in conformance with the unimpaired-viewing display mode by way of at least one of permitting at least one display characteristic as directed by at least one of the standard-brightness directive, or the resolution directive.

In some circumstances, it may be desirable to display different visual information that is different from a visual event notification. For example, it may be desirable to display visual information similar as described regarding FIGS. 3A-3B. For instance, a user may be interacting with an application, reading a document, viewing a video, and/or the like. In at least one example embodiment, the apparatus causes display, on a display, of different visual information in conformance with an unimpaired-viewing display mode based, at least in part, on an active viewing state. In at least one example embodiment, the different visual information is different from a visual event notification.

Figure 5:
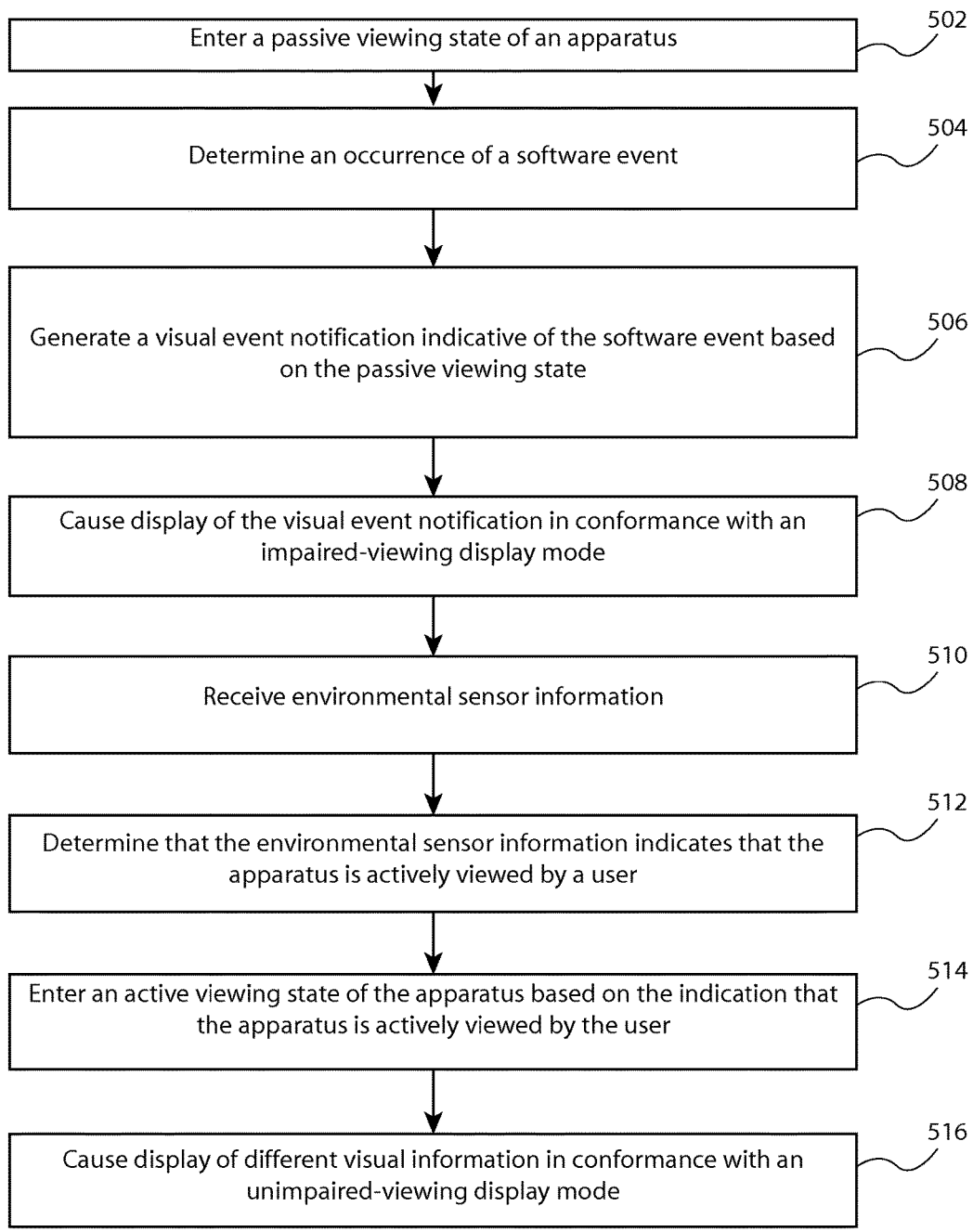
FIG. 5 is a flow diagram illustrating activities associated with display of a visual event notification in conformance with an impaired-viewing display mode according to at least one example embodiment.

FIG. 5 is a flow diagram illustrating activities associated with display of a visual event notification in conformance with an impaired-viewing display mode according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus enters a passive viewing state of the apparatus. The apparatus, the entering, and the passive viewing state may be similar as described regarding FIG. 1 and FIGS. 2A-2F.

At block 504, the apparatus determines occurrence of a software event. The determination and the software event may be similar as described regarding FIGS. 3A-3C and FIGS. 4A-4B.

At block 506, the apparatus generates a visual event notification that is indicative of the software event based, at least in part, on the passive viewing state. The generation, and the visual even notification may be similar as described regarding FIGS. 3A-3C and FIGS. 4A-4B.

At block 508, the apparatus causes display of the visual event notification in conformance with an impaired-viewing display mode based, at least in part, on passive viewing state. The display and the impaired-viewing display mode may be similar as described regarding FIG. 1, FIGS. 2A-2F, and FIGS. 4A-4B.

At block 510, the apparatus receives environmental sensor information. The receipt and the environmental sensor information may be similar as described regarding FIGS. 2A-2F.

At block 512, the apparatus determines that the environmental sensor information indicates that the apparatus is actively viewed by a user. The determination may be similar as described regarding FIGS. 2A-2F.

At block 514, the apparatus enters an active viewing state of the apparatus based, at least in part, on the determination that the environmental sensor information indicates that the apparatus is actively viewed by the user. The entering and the active viewing state may be similar as described regarding FIGS. 2A-2F.

At block 516, the apparatus causes display of different visual information in conformance with an unimpaired-viewing display mode based, at least in part, on the active viewing state. The causation of display, the different visual information, and the unimpaired-viewing display mode may be similar as described regarding FIG. 1, FIGS. 2A-2F, and FIGS. 3A-3C.

Figure 6:
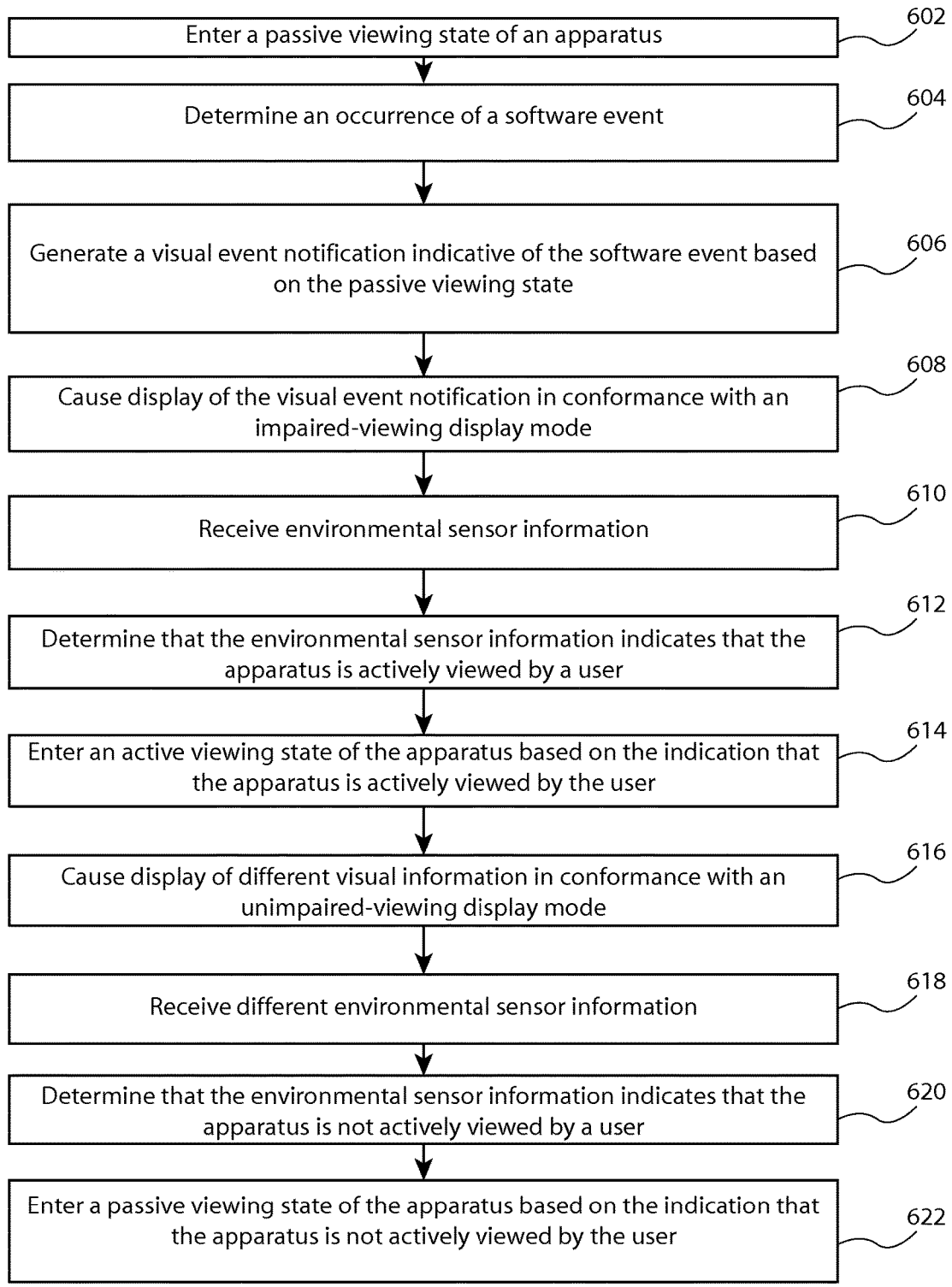
FIG. 6 is a flow diagram illustrating activities associated with entering a passive viewing state according to at least one example embodiment.

FIG. 6 is a flow diagram illustrating activities associated with entering a passive viewing state according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

In some circumstances, it may be desirable for an apparatus to receive different environmental sensor information. For example, a user of the apparatus may manipulate the apparatus, alter the orientation of the apparatus, and/or the like. In circumstances such as these, it may be desirable for the apparatus to enter a passive viewing state. For example, the environmental sensor information may indicate that the apparatus is not actively viewed by the user.

At block 602, the apparatus enters a passive viewing state of the apparatus, similarly as described regarding block 502 of FIG. 5. At block 604, the apparatus determines occurrence of a software event, similarly as described regarding block 504 of FIG. 5. At block 606, the apparatus generates a visual event notification that is indicative of the software event based, at least in part, on the passive viewing state, similarly as described regarding block 506 of FIG. 5. At block 608, the apparatus causes display of the visual event notification in conformance with an impaired-viewing display mode based, at least in part, on passive viewing state, similarly as described regarding block 508 of FIG. 5. At block 610, the apparatus receives environmental sensor information, similarly as described regarding block 510 of FIG. 5. At block 612, the apparatus determines that the environmental sensor information indicates that the apparatus is actively viewed by a user, similarly as described regarding block 512 of FIG. 5. At block 614, the apparatus enters an active viewing state of the apparatus based, at least in part, on the determination that the environmental sensor information indicates that the apparatus is actively viewed by the user, similarly as described regarding block 514 of FIG. 5. At block 616, the apparatus causes display of different visual information in conformance with an unimpaired-viewing display mode based, at least in part, on the active viewing state, similarly as described regarding block 516 of FIG. 5.

At block 618, the apparatus receives different environmental sensor information. The receipt and the different environmental sensor information may be similar as described regarding FIGS. 2A-2F.

At block 620, the apparatus determines that the different environmental sensor information indicates that the apparatus is not actively viewed by the user. The determination may be similar as described regarding FIGS. 2A-2F.

At block 622, the apparatus enters a passive viewing state of the apparatus based, at least in part, on the determination that the different environmental sensor information indicates that the apparatus is not actively viewed by the user. The entering and the passive viewing state may be similar as described regarding FIGS. 2A-2F.

Figure 7:
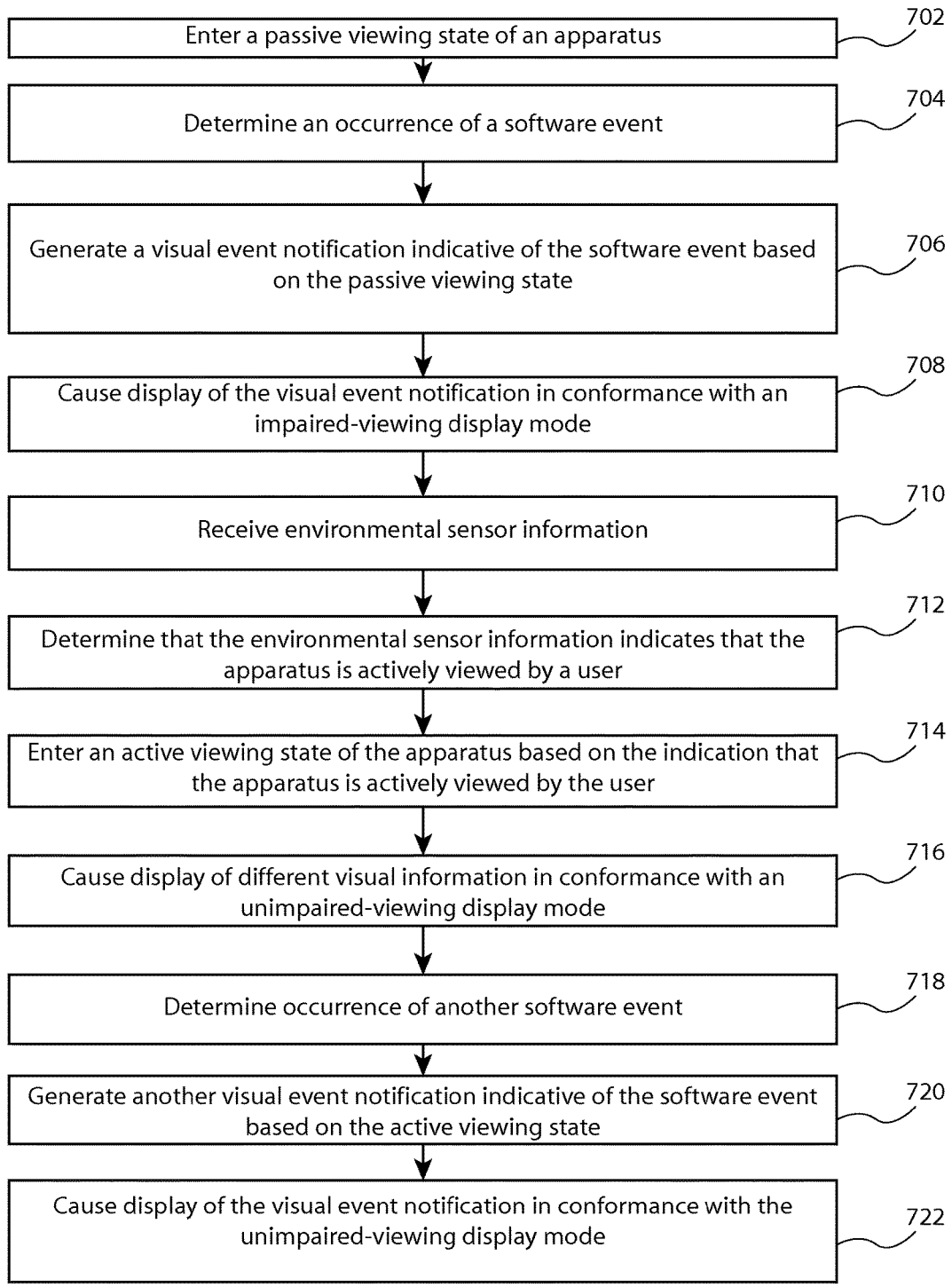
FIG. 7 is a flow diagram illustrating activities associated with display of a visual event notification in conformance with an unimpaired-display mode according to at least one example embodiment.

FIG. 7 is a flow diagram illustrating activities associated with display of a visual event notification in conformance with an unimpaired-display mode according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

In some circumstances, it may be desirable to cause display of another visual event notification in conformance with an unimpaired-viewing display mode. For example, the apparatus may determine occurrence of another software event during an active viewing state of the apparatus.

At block 702, the apparatus enters a passive viewing state of the apparatus, similarly as described regarding block 502 of FIG. 5. At block 704, the apparatus determines occurrence of a software event, similarly as described regarding block 504 of FIG. 5. At block 706, the apparatus generates a visual event notification that is indicative of the software event based, at least in part, on the passive viewing state, similarly as described regarding block 506 of FIG. 5. At block 708, the apparatus causes display of the visual event notification in conformance with an impaired-viewing display mode based, at least in part, on passive viewing state, similarly as described regarding block 508 of FIG. 5. At block 710, the apparatus receives environmental sensor information, similarly as described regarding block 510 of FIG. 5. At block 712, the apparatus determines that the environmental sensor information indicates that the apparatus is actively viewed by a user, similarly as described regarding block 512 of FIG. 5. At block 714, the apparatus enters an active viewing state of the apparatus based, at least in part, on the determination that the environmental sensor information indicates that the apparatus is actively viewed by the user, similarly as described regarding block 514 of FIG. 5. At block 716, the apparatus causes display of different visual information in conformance with an unimpaired-viewing display mode based, at least in part, on the active viewing state, similarly as described regarding block 516 of FIG. 5.

At block 718, the apparatus determines occurrence of another software event during the active viewing state. The determination and the software event may be similar as described regarding FIGS. 3A-3C and FIGS. 4A-4C.

At block 720, the apparatus generates another visual event notification that is indicative of the software event based, at least in part, on the active viewing state. The generation and the other visual event notification may be similar as described regarding FIGS. 3A-3C.

At block 722, the apparatus causes display of the other visual event notification in conformance with the unimpaired-viewing display mode based, at least in part, on active viewing state. The display and the other visual even notification may be similar as described regarding FIG. 1, FIGS. 2A-2F, and FIGS. 3A-3C.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 502 of FIG. 5 may be performed after block 504 of FIG. 5. Furthermore, if desired, one or more of the above-described functions may be optional or may be combined. For example, block 502 of FIG. 5 may be optional and/or combined with block 504 of FIG. 5.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor; and
   at least one memory comprising computer program code, the memory and the computer program code configured to, working with the processor, cause the apparatus to perform at least the following:
      entering of a passive viewing state of the apparatus;
      determination of occurrence of a software event;
      generation of a visual event notification that is indicative of the software event based, at least in part, on the passive viewing state;
      causation of display, on a display, of the visual event notification in conformance with an impaired-viewing display mode based, at least in part, on passive viewing state, wherein the impaired-viewing display mode provides visual-impairment compensation for the visual event notification by way of at least one format restriction such that the visual event notification is more perceivable than visual information without visual impairment compensation;
      receipt of environmental sensor information;
      determination that the environmental sensor information indicates that the apparatus is actively viewed by a user;
      entering of an active viewing state of the apparatus based, at least in part, on the determination that the environmental sensor information indicates that the apparatus is actively viewed by the user; and
      causation of display, on the display, of different visual information in conformance with an unimpaired-viewing display mode based, at least in part, on the active viewing state.

2. The apparatus of claim 1, wherein the memory comprises computer program code configured to, working with the processor, cause the apparatus to perform:
   receipt of different environmental sensor information;
   determination that the different environmental sensor information indicates that the apparatus is not actively viewed by the user; and
   entering of the passive viewing state of the apparatus based, at least in part, on the determination that the different environmental sensor information indicates that the apparatus is not actively viewed by the user.

3. The apparatus of claim 1, wherein the memory comprises computer program code configured to, working with the processor, cause the apparatus to perform:
   determination of occurrence of another software event during the active viewing state;
   generation of another visual event notification that is indicative of the software event based, at least in part, on the active viewing state; and
   causation of display, on the display, of the other visual event notification in conformance with the unimpaired-viewing display mode based, at least in part, on the active viewing state.

4. The apparatus of claim 1, wherein the passive viewing state is an operational state in which information is caused to be displayed in conformance with the impaired-viewing display mode absent display of information in the unimpaired-viewing display mode.

5. The apparatus of claim 1, wherein the passive viewing state is characterized by a state in which the apparatus is configured in a manner that provides visual impairment compensation.

6. The apparatus of claim 1, wherein the active viewing state is characterized by a state in which the apparatus is configured in a manner that avoids visual impairment compensation.

7. The apparatus of claim 1, wherein the generation of the visual event notification based, at least in part, on the passive viewing state is performed such that content of the visual event notification conforms with the impaired-viewing display mode.

8. The apparatus of claim 1, wherein the at least one format restriction comprises display resolution reduction.

9. The apparatus of claim 1, wherein the apparatus comprises the display.

10. A method comprising:
    entering a passive viewing state of an apparatus;
    determining occurrence of a software event;
    generating a visual event notification that is indicative of the software event based, at least in part, on the passive viewing state;
    causing display, on a display, of the visual event notification in conformance with an impaired-viewing display mode based, at least in part, on passive viewing state, wherein the impaired-viewing display mode provides visual-impairment compensation for the visual event notification by way of at least one format restriction such that the visual event notification is more perceivable than visual information without visual impairment compensation;
    receiving environmental sensor information;
    determining that the environmental sensor information indicates that the apparatus is actively viewed by a user;
    entering an active viewing state of the apparatus based, at least in part, on the determination that the environmental sensor information indicates that the apparatus is actively viewed by the user; and
    causing display, on the display, of different visual information in conformance with an unimpaired-viewing display mode based, at least in part, on the active viewing state.

11. The method of claim 10, further comprising:
    receiving different environmental sensor information;
    determining that the different environmental sensor information indicates that the apparatus is not actively viewed by the user; and
    entering the passive viewing state of the apparatus based, at least in part, on the determination that the different environmental sensor information indicates that the apparatus is not actively viewed by the user.

12. The method of claim 10, further comprising:
    determining occurrence of another software event during the active viewing state;
    generating another visual event notification that is indicative of the software event based, at least in part, on the active viewing state; and
    causing display, on the display, of the other visual event notification in conformance with the unimpaired-viewing display mode based, at least in part, on the active viewing state.

13. The method of claim 10, wherein the passive viewing state is an operational state in which information is caused to be displayed in conformance with the impaired-viewing display mode absent display of information in the unimpaired-viewing display mode.

14. The method of claim 10, wherein the passive viewing state is characterized by a state in which the apparatus is configured in a manner that provides visual impairment compensation.

15. The method of claim 10, wherein the active viewing state is characterized by a state in which the apparatus is configured in a manner that avoids visual impairment compensation.

16. The method of claim 10, wherein the generation of the visual event notification based, at least in part, on the passive viewing state is performed such that content of the visual event notification conforms with the impaired-viewing display mode.

17. At least one non-transitory computer-readable medium encoded with instructions that, when executed by a processor, perform:
   entering of a passive viewing state of the apparatus;
   determination of occurrence of a software event;
   generation of a visual event notification that is indicative of the software event based, at least in part, on the passive viewing state;
   causation of display, on a display, of the visual event notification in conformance with an impaired-viewing display mode based, at least in part, on passive viewing state, wherein the impaired-viewing display mode provides visual-impairment compensation for the visual event notification by way of at least one format restriction such that the visual event notification is more perceivable than visual information without visual impairment compensation;
   receipt of environmental sensor information;
   determination that the environmental sensor information indicates that the apparatus is actively viewed by a user;
   entering of an active viewing state of the apparatus based, at least in part, on, the determination that the environmental sensor information indicates that the apparatus is actively viewed by the user; and
   causation of display, on the display, of different visual information in conformance with an unimpaired-viewing display mode based, at least in part, on the active viewing state.

18. The medium of claim 17, further encoded with instructions that, when executed by a processor, perform:
   receipt of different environmental sensor information;
   determination that the different environmental sensor information indicates that the apparatus is not actively viewed by the user; and
   entering of the passive viewing state of the apparatus based, at least in part, on the determination that the different environmental sensor information indicates that the apparatus is not actively viewed by the user.

19. The medium of claim 17, further encoded with instructions that, when executed by a processor, perform:
   determination of occurrence of another software event during the active viewing state;
   generation of another visual event notification that is indicative of the software event based, at least in part, on the active viewing state; and
   causation of display, on the display, of the other visual event notification in conformance with the unimpaired-viewing display mode based, at least in part, on the active viewing state.

20. The method of claim 17, wherein the passive viewing state is an operational state in which information is caused to be displayed in conformance with the impaired-viewing display mode absent display of information in the unimpaired-viewing display mode.

* * * * *